(12) United States Patent
Levitz et al.

(10) Patent No.: US 9,901,117 B2
(45) Date of Patent: Feb. 27, 2018

(54) INDUCTIVE CHARGING FOR AN ELECTRONIC CIGARETTE

(71) Applicant: SIS Resources, Ltd., Beit Shemesh (IL)

(72) Inventors: Robert Levitz, Shemesh (IL); Dorron Levy, Givatayim (IL); Nehemia Amir, Rishon Letzion (IL); Bernard C. Juster, Netanya (IL); Eyal Peleg, Tsoran (IL)

(73) Assignee: SIS RESOURCES, LTD., Beit Shemesh (IL)

( * ) Notice: Subject to any disclaimer, the term of this patent is extended or adjusted under 35 U.S.C. 154(b) by 720 days.

(21) Appl. No.: 14/178,545

(22) Filed: Feb. 12, 2014

(65) Prior Publication Data

US 2014/0224267 A1    Aug. 14, 2014

Related U.S. Application Data

(60) Provisional application No. 61/763,506, filed on Feb. 12, 2013.

(51) Int. Cl.
*A24F 47/00* (2006.01)
*H02J 7/02* (2016.01)

(52) U.S. Cl.
CPC ............ *A24F 47/008* (2013.01); *H02J 7/025* (2013.01)

(58) Field of Classification Search
None
See application file for complete search history.

(56) References Cited

U.S. PATENT DOCUMENTS

| 7,906,936 | B2 | 3/2011 | Azancot et al. |
| 7,952,322 | B2 | 5/2011 | Partovi et al. |
| 2007/0279002 | A1 | 12/2007 | Partovi |
| 2009/0272379 | A1* | 11/2009 | Thorens ............... A24F 47/008 128/202.21 |
| 2009/0283103 | A1 | 11/2009 | Nielsen et al. |
| 2012/0227753 | A1 | 9/2012 | Newton |
| 2013/0300350 | A1 | 11/2013 | Xiang |
| 2015/0303735 | A1* | 10/2015 | Kari ....................... H01F 38/14 320/108 |

FOREIGN PATENT DOCUMENTS

| CN | 101524187 A | 9/2009 |
| CN | 101606758 A | 12/2009 |
| EP | 2670024 A1 | 12/2013 |

(Continued)

OTHER PUBLICATIONS

Office Action for European Patent Application No. 14707468.6 dated May 25, 2016.

(Continued)

*Primary Examiner* — Michael H Wilson
*Assistant Examiner* — Katherine Will
(74) *Attorney, Agent, or Firm* — Harness, Dickey & Pierce, P.L.C.

(57) ABSTRACT

An electronic cigarette ("e-Cig") may be wirelessly charged through an inductive charging system. A receiving coil in or on the e-Cig may be in proximity to a wireless charger that transmits electrical power to the battery of the e-Cig. Alignment of the receiving coil in the e-Cig with a charging base can wirelessly charge the battery of the e-Cig.

13 Claims, 8 Drawing Sheets

(56) References Cited

FOREIGN PATENT DOCUMENTS

RU          103281 U1    4/2011
WO     WO-03096361 A1   11/2003
WO    WO-2012-100431 A1  8/2012

OTHER PUBLICATIONS

International Search Report and Written Opinion dated Apr. 25, 2014 for PCT/IL2014/050146.
Office Action for Chinese Patent Application No. 201480008579.4 issued on Mar. 31, 2017 and English translation thereof.
Office Action for Russian Patent Application No. 2015138899 issued on Jan. 19, 2017 and English translation thereof.

* cited by examiner

Flexible PCB with Printed Coils    E-Cig

INDUCTIVE CHARGING FOR AN ELECTRONIC CIGARETTE

PRIORITY

This application claims priority to U.S. Provisional Application No. 61/763,506, entitled "Inductive Charging For Electronic Cigarette," filed on Feb. 12, 2013, the entire disclosure of which is hereby incorporated by reference.

BACKGROUND

An electronic cigarette ("e-cigarette" or "e-Cig") is a device that emulates tobacco cigarette smoking, by producing smoke replacement that may be similar in its physical sensation, general appearance, and sometimes flavor (i.e., with tobacco fragrance, menthol taste, added nicotine etc.). The e-Cig may include a battery portion and a cartomizer portion (i.e. "cartridge"). The battery portion of the e-Cig includes a controller and battery for powering the device and the cartomizer portion generates an aerosol mist (i.e. e-smoke or vapor) that is a replacement for cigarette smoke. In particular, the cartomizer may use heat, ultrasonic energy, or other means to atomize/vaporize an "e-Liquid" solution (e.g. based on propylene glycol, or glycerin, for example including taste and fragrance ingredients) into an aerosol mist. The atomization may be similar to nebulizer or humidifier vaporizing solutions for inhalation. The cartomizer may include, or may be referred to as an atomizer, and the atomization may be caused by a heating element that heats the e-Liquid to generate the mist/vapor/e-smoke.

The e-Cig may receive electric power from an internal battery. The internal battery may be an internal chargeable battery. Charging of the battery may be time consuming and require a cord that connects with the battery portion. The charging may require detaching the cartridge containing the liquid and atomizer from the battery section, and attaching a cord to a wall charger, to a USB charger, or to a car charger. Charging time may be several hours, during which the user cannot use the e-Cig because the cartridge is stored. This process of charging may be frequent, cumbersome, and requires attention from the smoker.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
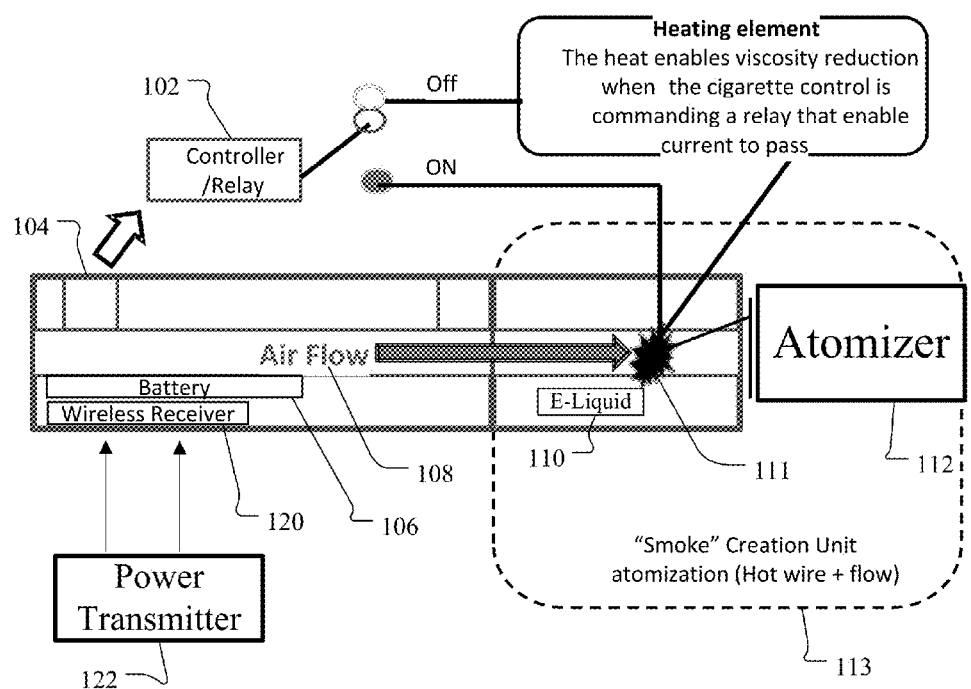
FIG. 1 is a diagram of an electronic cigarette.

The system and method described herein describe an electronic cigarette ("e-Cig") wireless charging system and method. In particular, the e-Cig may be wirelessly charged through an inductive charging system. A receiving coil in or on the e-Cig may be in proximity to a primary coil in a wireless charger that wirelessly transmits electrical power to the battery of the e-Cig. Alignment of the receiving coil in the e-Cig with the primary coil in the charging base can wirelessly charge the battery of the e-Cig. The wireless charging may be done with the fully-assembled e-Cig. Usage of the e-Cig while being charged may be possible since no cord is required for charging. Wireless charging may eliminate the need to assemble and disassemble the e-Cig for charging, and may eliminate the need for the smoker/vaper to carry a charger. The smoking/vaping experience may be hampered when connected with cable. The wireless charging describe below includes the convenience merely placing an e-Cig on a charger (i.e. base or charging device). As described, the charging device may be designed to resemble an ash tray or as an easy drop-in container/cup, so that usage of the charging is accomplished with little or no effort from the user and the charging is automatic and continuous.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a diagram of an electronic cigarette ("e-Cig"). The "smoke" produced by an e-Cig is a created by turning an e-Liquid 110 into mist and some vapor with an atomizer 112. The e-Liquid 110 may be stored in a liquid container. The cartomizer 113 may include the atomizer 112 and the e-Liquid 110. The cartomizer 113 may also be referred to as a cartridge throughout this disclosure and may be disposable. The e-liquid 110 may have a high viscosity at room temperature to enable longer shelf life and reduce leakages; however, this high viscosity may reduce the atomization rate. The e-Liquid is atomized via airflow 108, generated by the inhalation of the user (i.e. the smoker or consumer or vapor). In order to reduce the viscosity, to a level enabling atomization, external heat may be applied through the heating element 111, which may include a heating coil and a wick that is soaked in or includes a portion of the e-Liquid 110. The heating element 111 may be a coil in one embodiment that wraps around the wick in order to heat the liquid on the wick. Local viscosity may be reduced via heating, while inhalation occurs, enabling atomization in the inhalation-generated flow of air 108. The e-Liquid 110 may be heated via an electric current flowing through the heating element 111 and may then be atomized and evaporated through the e-Cig and may contain tastes and aromas that create a smoking sensation. The controller 102 may be activated due to airflow 108 (from the inhaled air) passing a flow sensor 104. The sensor 104 may be activated by the pressure drop across the sensor and may directly switch the battery 106 power on, or be used as an input for the controller 102 that then switches the battery 106 current on. Although illustrated as separate from the e-Cig, the controller 102 may be a part of the e-Cig (e.g. along with the battery 106). The battery 106 may be a separate/removable assembly. The battery 106 may include one or more electronic chips controlling and communicating from it. It may connect with the cartomizer 113, which can be replaced or changed (e.g. when a new/different e-Liquid is desired).

The e-Cig may include two parts. The first part is often just referred to as the battery or battery portion (i.e. battery enclosure) and it includes the battery cell, the airflow sensor and the controller. The second part is the cartridge (i.e. cartomizer 113) includes the e-Liquid that is required for smoke and flavor generation. In other embodiments, there may be more or fewer parts. An airflow tube of the battery enclosure and an airflow tube of the cartridge may enable the smoker to puff through the e-Cig and activate the airflow sensor inside the battery portion. This may trigger the controller and cause the coil inside the cartridge to get hot, evaporate the liquid that is in the cartridge and cause smoke (i.e. vapor). The battery portion may instruct the cartridge to turn on, after which the coil is heated by the power applied by battery side (it may use a PWM scheme for controlling the heating profile).

A wireless receiver 120 may wirelessly receive power from the power transmitter 122 for charging the battery 106. The wireless receiver 120 may be a power receiving coil (i.e. "secondary coil") that corresponds with a primary coil in the power transmitter 122. The combination of the coils may constitute a transformer and alignment of the primary and receiving coil establish electro-magnetic field induction that induces current from the primary coil to the receiving coil. This transmission is through the air rather than through a ferrite core in a wired charger. The power transmitter 122 may be part of a charger (i.e. "a base") that receives the electronic cigarette in order to align the primary coil in the power transmitter 122 to the receiving coil 120 in the e-Cig. Exemplary inductive charging is described in U.S. Pat. No. 7,952,322, and U.S. Pat. No. 7,906,936, each of which is hereby incorporated by reference. Although not shown, the wireless receiver 120 may have a two-wire connection with the battery 106 for charging the battery 106 when receiving wireless power from the power transmitter 122.

Although not shown in FIG. 1, the e-Cig may include a communications chip. For example, there may be a near field communication ("NFC") chip that communicates externally from the e-Cig. In one embodiment, the receiving coil 120 may be a part of the NFC bunch. The NFC chip may be bundled with the wireless receiver.

Figure 2:
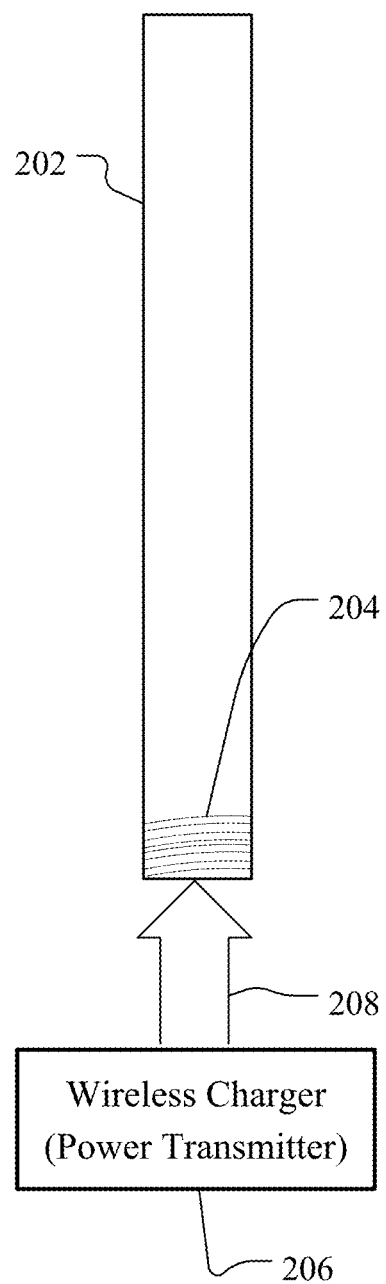
FIG. 2 is a diagram of wireless charging of an electronic cigarette.

FIG. 2 is a diagram of wireless charging of an e-Cig 202. The e-Cig 202 includes the power receiving coil 204 near one tip. The power receiving coil 204 may be on the battery portion of the e-Cig 202 and may be connected with the battery. The power receiving coil 204 receives wireless power 208 from a wireless charger 206. The wireless charger 206 includes a primary coil that corresponds with the power receiving coil 204 from the e-Cig 202.

Figure 4:
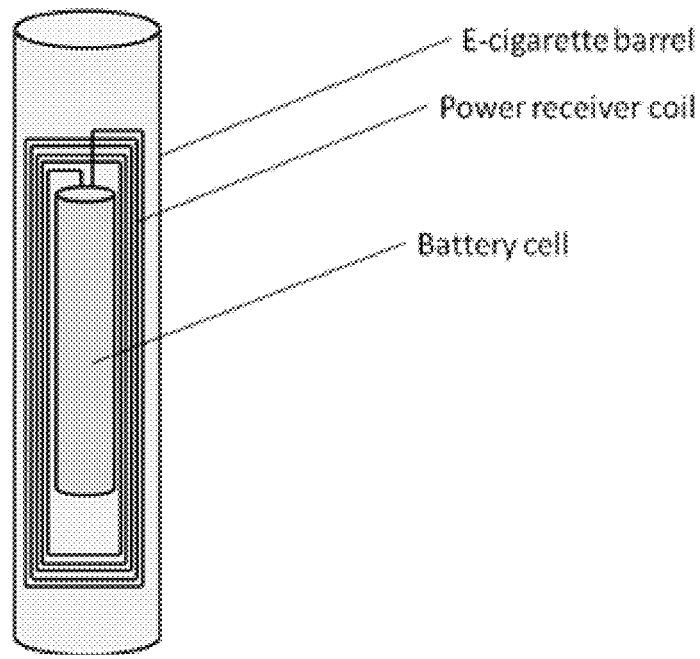
FIG. 4 is a diagram of one embodiment of the wireless charging coil in an electronic cigarette.
Figure 7:
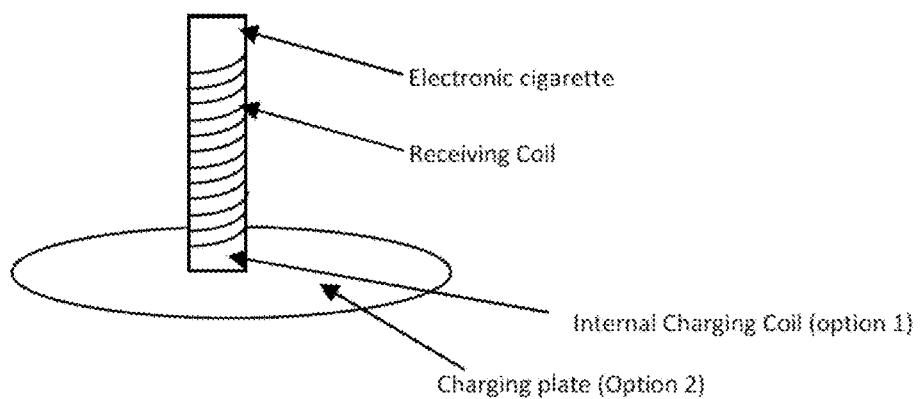
FIG. 7 is a diagram of an alternative embodiment of an electronic cigarette with a charging coil.
Figure 10:
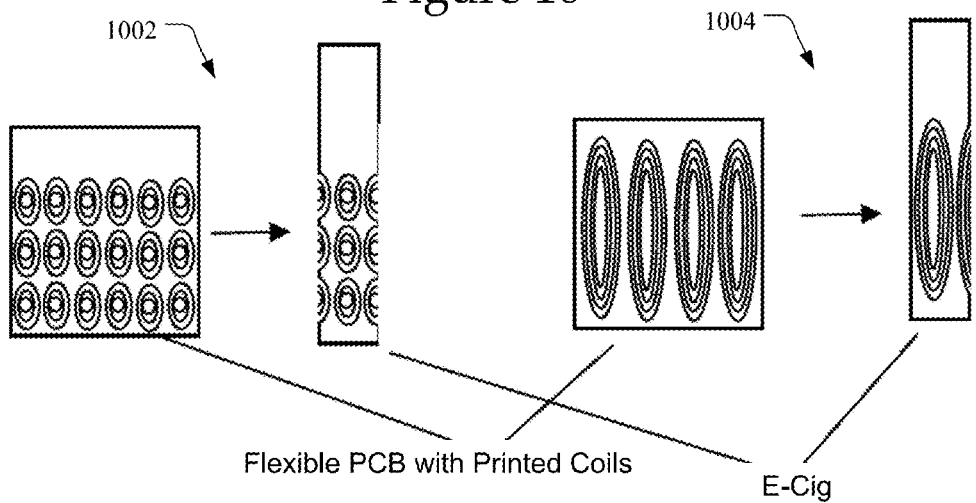
FIG. 10 is a diagram of exemplary coils on an electronic cigarette for wireless charging.

This embodiment may allow for a large number of windings, which can compensate for a relatively small cross section area of the coil. The factors that may determine charging efficiency may include: (1) cross section area; (2) number of windings; and (3) windings being closer to each other. In particular, these factors may be used to increase and improve inductance. The e-Cig may have a receiving coil that wraps around its outer shell or serves an integral part of its outer shell. The inductive receptor of the e-Cig may assume several possible embodiments, including an external coil film wrapped around the external metal shell, an external shell of the battery section of the e-Cig is a coil, or the external shell of the e-Cig is constructed of plastic with an internal coil (or super thin coil film) located within the body of the e-Cig. The body of the e-Cig might be plastic with an internal coil film located somewhere within the body of the battery section. In alternative embodiments, the receiving coil 204 may be located at a different location on the e-Cig 202 or may be formed with a different arrangement than shown in FIG. 2. FIGS. 4, 7, and 10 illustrate alternative embodiments for the receiving coil 204.

Figure 3:
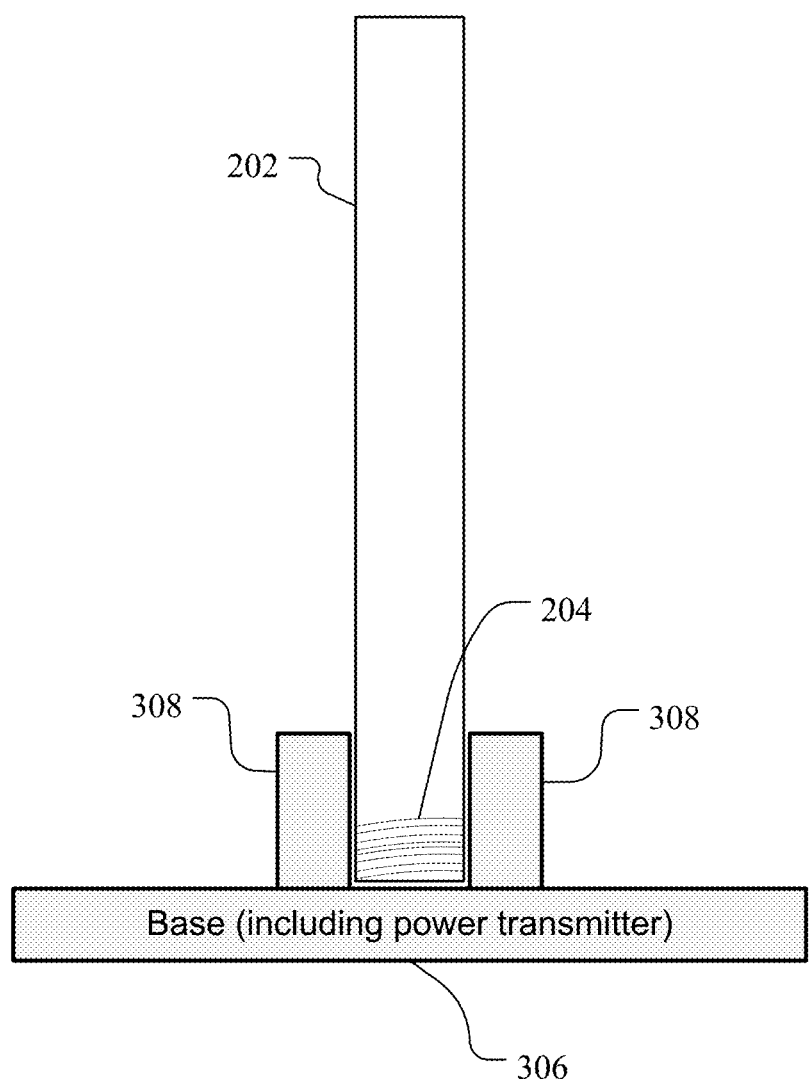
FIG. 3 is a diagram of an exemplary charging base for wirelessly charging an electronic cigarette.

FIG. 3 is a diagram of an exemplary charging base for wirelessly charging the e-Cig 202 from FIG. 2. FIG. 3 is one embodiment of a charging base 306 designed to more easily receive the e-Cig 202 and to align the power coil within the base 306 and the receiving coil 204 in the e-Cig 202. The charging base 306 may include or be connected with a retaining wall 308 that is designed to receive and stabilize the e-Cig 202 in an orthogonal or upright position. The user only needs to insert the receiving coil 204 end of the e-Cig 202 into the base 306 within the retaining wall 308. The base 306 provides a simpler and automated way to align the coils which results in more efficient wireless charging. The base 306 and retaining wall 308 may be made from a variety of materials and only need to be configured to hold the e-Cig 202 and to include the power coil (i.e. "power transmitter"). This is merely one embodiment of a base that positions the e-Cig 202.

FIG. 4 is a diagram of one embodiment of the wireless charging coil in an e-Cig. The e-Cig may include a battery cell within the e-Cig barrel. The power receiving coil may be disposed adjacent to the battery cell within the e-Cig barrel. Alternatively, the power receiver coil may be wrapped around, or surrounding the battery cell.

Figure 5:
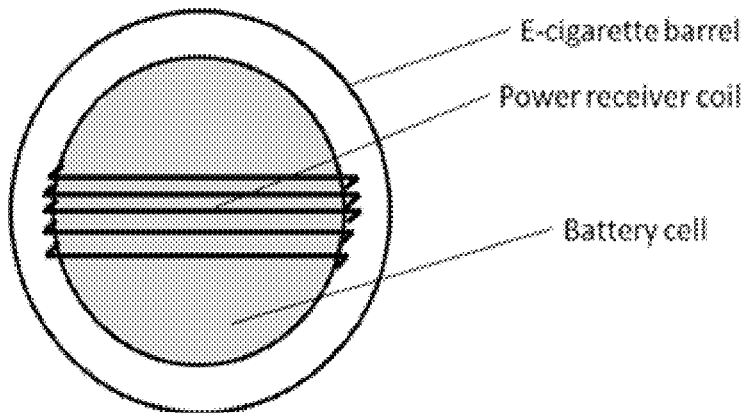
FIG. 5 is a diagram of a cross-section of the electronic cigarette from the embodiment in FIG. 4.

FIG. 5 is a diagram of a cross-section of the e-Cig from the embodiment in FIG. 4. The e-Cig includes a barrel that includes the battery cell. The power receiver coil passes under the battery cell in the embodiment shown in FIG. 5. With a receiver coil at the tip of the battery cell, which may also be the tip of the e-Cig, there may be a closer connection with charger, such as the one shown in FIG. 6.

Figure 6:
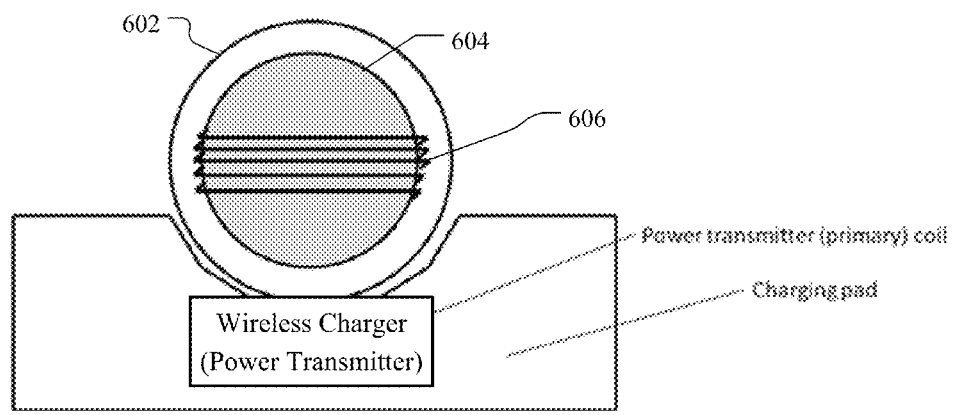
FIG. 6 is a diagram of a charging pad for the electronic cigarette from the embodiment in FIG. 4 according to one embodiment.

FIG. 6 is a diagram of a charging pad for the e-Cig from the embodiment in FIG. 4 according to one embodiment. The e-Cig includes a barrel 602 surrounding a battery cell 604. The charging pad is one example of a charger and it includes a primary coil or power transmitter. When the primary coil is adjacent the power receiving coil 606, power is transmitted from the primary coil to the power receiving coil 606 that is then connected to the battery cell 604. The embodiment in FIG. 6 illustrates the e-Cig on its side within the charging pad. The charging pad may have an indentation that fits the e-Cig. In one embodiment, the receiving coil 604 may surround the battery cell 604 such that the angle of the e-Cig will not affect the charge receiving from the primary coil. Alternatively, the e-Cig may have to be turned so that the receiving coil 606 matches with the primary coil. The shape of the charging pad may be modified to receive the e-Cig at the right angle. Alternatively, indentations or magnets may be used to move the e-Cig into the proper position for optimal wireless charging. For example, the e-Cig may have one flat surface, or several flat points that will prevent it from rolling when placed on a flat charging surface.

FIG. 7 is a diagram of an alternative embodiment of an e-Cig with a charging coil. The embodiment shown in FIG. 7 demonstrates an internal charging coil [option 1] that is surrounded concentrically by an external receiving coil of an electronic cigarette. Alternatively, the charging coil may be placed within a charging plate located underneath the electronic cigarette [option 2]. The e-Cig may sit vertically and perpendicular to the charging plate (for optimum charging performance) or placed at any angle up to a degree that still allows it to receive charge from the base.

The receiving coil is shown to be throughout the e-Cig or at least the battery portion of the e-Cig. This arrangement of the receiving coil may provide a higher inductance for coupling with a power transmitter. Conversely, the embodiment shown in FIGS. 2-3 illustrated the coil bunched near one end for improving charging efficiency. The embodiment in FIG. 7 may be more versatile and work with a wider variety of charging devices. In particular, FIG. 7 illustrates a charging plate that includes an internal charging coil as the primary coil.

Figure 8:
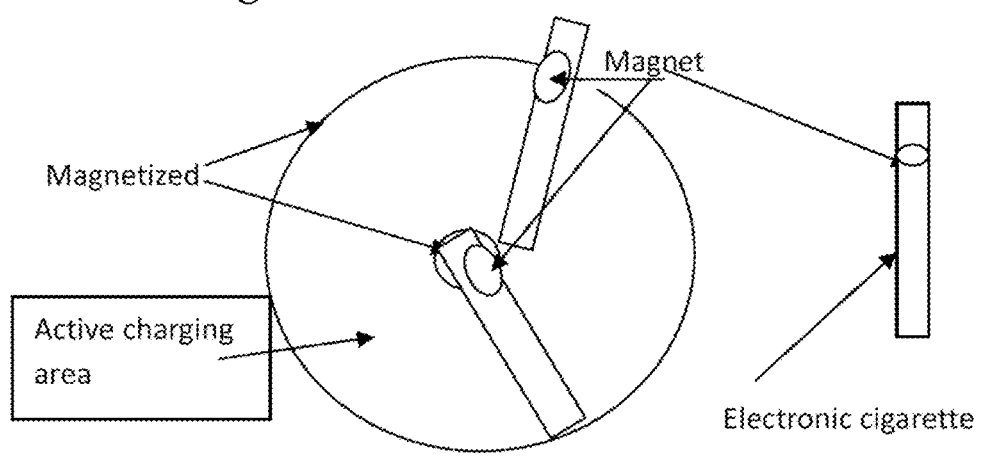
FIG. 8 is a diagram of an embodiment of a magnetized charging area.

FIG. 8 is a diagram of an embodiment of a magnetized charging area. There may be a magnet in the e-Cig and a corresponding magnet within the active charging area in order to position the e-Cig to align the coils. The positioning system with magnets may actually relocate the e-Cig to the optimal location in proximity to the charging coil. The system may be based on a magnet that is attached to the cigarette. When the e-Cig approaches charger, the positioning mechanism shifts the position of the e-Cig to its optimal charging position in relation to the active charging area. The magnet on the e-Cig may be a normal magnet or electromagnet that receives its power when placed close to the charging surface.

Figure 9:
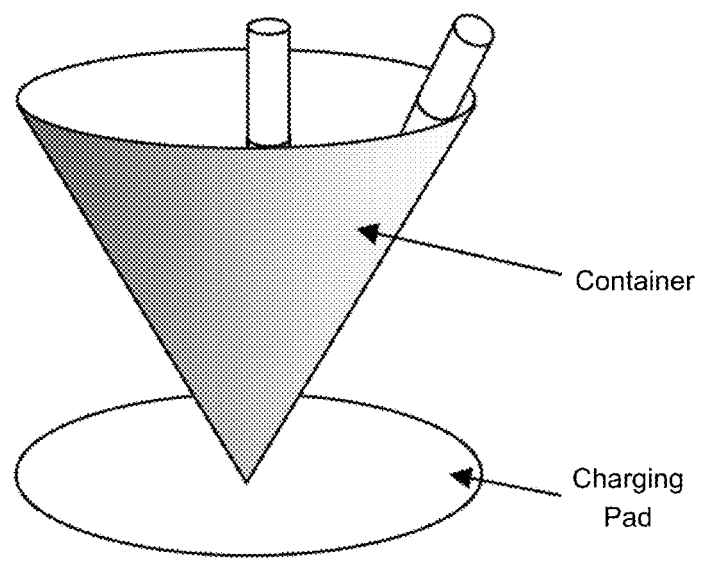
FIG. 9 is a diagram of an embodiment of a container for receiving electronic cigarettes for wireless charging.

FIG. 9 is a diagram of an embodiment of a container for receiving electronic cigarettes for wireless charging. The container may be a cup of different shapes or sizes that receives one or more e-Cigs for positioning them proximate to the charging pad for wireless charging. In one embodiment, the magnets from FIG. 8 may be unnecessary with a container or cup that directs the positioning of the e-Cigs. In this embodiment a charging cup is mechanically connected to the charging plate. Each e-Cig placed in the cup is positioned in a way that constructs an angle that is less than 90 degrees from the charging plate. There may be a slightly curved surface or a weight inside the e-Cig that positions it with the optimal side down.

FIG. 10 is a diagram of exemplary coils on an electronic cigarette for wireless charging. FIG. 10 illustrates an exemplary embodiment regarding the arrangement of the receiving coil(s) on the e-Cig. The receiving coil may use flexible laminate printed circuit board ("PCB") configurations in which the coils are printed on the flexible PCB. In one embodiment, the flexible laminate PCB may cover one side of the battery such that the coils are connected to each other in a way that allows the current to pass from one coil to the other in the same direction. In the embodiment shown in FIG. 10, there may be a PCB sheet that covers the e-Cig. The printed circuit coils on the same side are connected is series together, and form one group. The internal controller may select the group that has the highest voltage as the charging source. The multi-row PCB 1002 may include multiple rows of coils, while the single row PCB 1004 is a larger coil that has a greater surface area.

Figure 11:
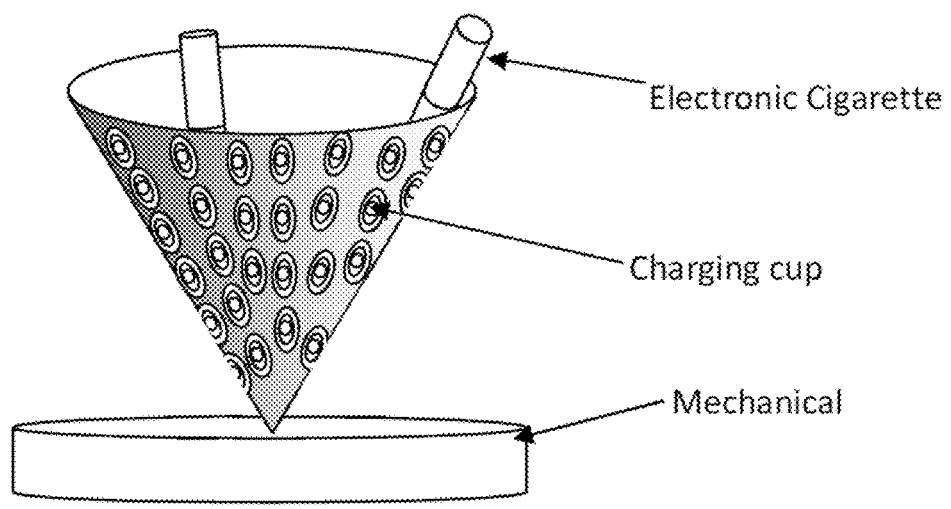
FIG. 11 is a diagram of an alternative container for receiving electronic cigarettes for wireless charging.

FIG. 11 is a diagram of an alternative container from receiving electronic cigarettes for wireless charging. FIG. 11 is an alternative embodiment of FIG. 9 in which there a coils that are part of the container or charging cup. There may be a mechanical base that does not have a primary coil because the primary coil(s) are on the container or charging cup. In particular, the charging cap is covered with flexible laminate PCB sheet that re used as the charger coils. The coils may be printed on the circuit and may be in different shapes in order to optimize the charging process.

Figure 12:
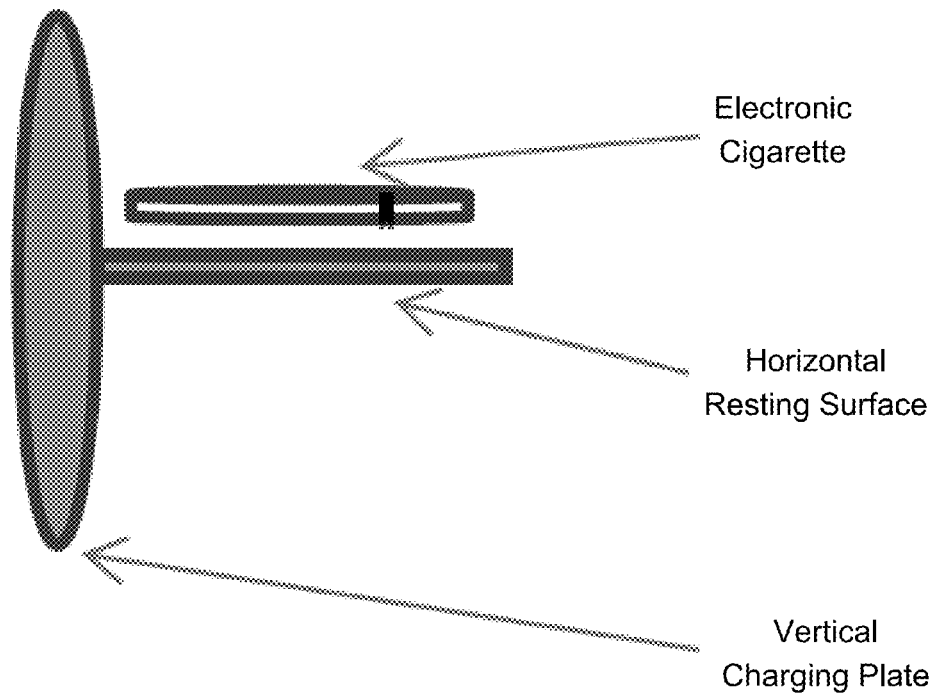
FIG. 12 is a diagram of an embodiment of a vertical charging plate for charging an electronic cigarette.

FIG. 12 is a diagram of an embodiment of a vertical charging plate for charging an electronic cigarette. An alternative embodiment shown in FIG. 12 consists of a charging plate positioned vertically upward. Such a configuration may allow the e-Cig to be charged while lying in a horizontal position adjacent to the plate at an optimal charging angle. The receiving coil on the e-Cig may be near an end that is positioned nearest the vertical charging plate. The vertical charging plate includes the primary coil(s) for charging the receiving coils in the e-Cig. The horizontal resting surface may be merely mechanical with no coils in one embodiment.

The inductive charging source may be designed to optionally stop automatically when the e-Cigarette is properly charged. Additionally, the heating element (i.e. "atomization coil") located inside the cartomizer may be designed to disconnect from its circuit during the charging cycle in order that it not pass voltage to the chip if at all powered during inductive charging.

In the inductive charging arrangements, the electronic cigarette or charging base may have light indication from the correct charging position. Other indications may include: Visual and/or audio indications from the charger itself, and even connections to remote communication capability, presenting charging status on smartphone or other computer device. Another embodiment may be the addition of wireless inductive recharging to disposable e-Cigs, which may enable a larger-capacity (liquid-wise) disposable e-Cig without the need for larger battery.

In such implementation, visual indications such as lighted e-Cig tip blinking may be used to indicate needed charging, and additionally to indicate a fully charged e-Cig. The indications may be triggered by taking an elongated drag of the e-Cig. Smoking and charging may be done intermittingly, just like placing a regular cigarette on an ash tray between puffs, with the convenience of inductive wireless charging.

Inductive charging design can be of various shapes, as described above. It may also be built into furniture, with pads ready for use as part of tables or armrests. Resonant inductive charging may be utilized to achieve larger range (to overcome table thickness influence in one example).

Another embodiment for e-Cig inductive charging is in form of a Personal Charging Case (PCC) that may be charged inductively and also may charge the e-Cig inductively. For example, the e-Cig while placed inside the PCC may be automatically charged by suitable coils inside the PCC. For example, the PCC may include a primary coil so that the PCC wirelessly charges the e-Cig. Suitable circuitry may convert the PCC charge into the inductive fields that will charge the e-Cig. In one embodiment, the PCC may include a receiving coil and be charged wirelessly and the PCC may then be used to charge the e-Cig.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. An electronic cigarette wireless charging system comprising:
    an electronic cigarette comprising a barrel, a battery and a power receiving coil coupled with the battery, wherein the battery is within the barrel, the battery has a bottom surface, the power receiving coil is wrapped around or surrounding the battery in a lengthwise manner such that portions of the power receiving coil pass under the bottom surface of the battery, and the power receiving coil charges the battery upon receiving wireless power; and
    a charger comprising a primary coil that is positioned to wirelessly connect the power receiving coil with the primary coil during a charging operation.

2. The system of claim 1 wherein the charging operation comprises Placement of the electronic cigarette on or near the charger.

3. The system of claim 2 wherein the charger comprises a container for receiving the electronic cigarette, wherein the charging operation begins when the electronic cigarette is located in the container.

4. The system of claim 3 wherein the container comprises a personal carrying case for storing and transporting the electronic cigarette.

5. An electronic cigarette for wireless charging comprising:
    an electronic cigarette cartridge;
    a barrel;
    a battery that is within the barrel and provides power to the cartridge; and
    a receiving coil coupled with the battery, wherein the battery has a bottom surface, the receiving coil is wrapped around or surrounding the battery in a lengthwise manner such that portions of the power receiving coil pass under the bottom surface of the battery and the receiving coil receives power wirelessly from a primary coil in a wireless power transmitter, further wherein the power received charges the battery.

6. The electronic cigarette of claim 5 wherein the cartridge comprises:
    a container for a liquid;
    a wick that is soaked with the liquid; and
    a heating element that atomizes the liquid by heating the wick.

7. The electronic cigarette of claim 6 wherein the atomization generates a mist from the liquid that acts as a smoke replacement.

8. The electronic cigarette of claim 5 wherein the battery is rechargeable.

9. The electronic cigarette of claim 5 wherein the receiving coil is disposed near a tip of a battery portion end of the electronic cigarette.

10. The electronic cigarette of claim 9 wherein the battery portion end of the electronic cigarette is opposite of the cartridge.

11. The electronic cigarette of claim 5 wherein the primary coil is located in a base charger.

12. The electronic cigarette of claim 11 wherein the electronic cigarette further comprises a magnet that corresponds with a magnet in the base charger, wherein the magnet in the electronic cigarette is configured to position the electronic cigarette relative to the base charger.

13. The electronic cigarette of claim 12 wherein the positioning comprises an alignment of the primary coil in the base charger with the receiving coil in the electronic cigarette.

* * * * *